(12) United States Patent
Tsukatani

(10) Patent No.: US 7,830,441 B2
(45) Date of Patent: Nov. 9, 2010

(54) IMAGE PICKUP APPARATUS AND CONTROLLING METHOD THEREOF

(75) Inventor: Eiri Tsukatani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 545 days.

(21) Appl. No.: 11/558,640

(22) Filed: Nov. 10, 2006

(65) Prior Publication Data

US 2007/0115383 A1   May 24, 2007

(30) Foreign Application Priority Data

Nov. 18, 2005   (JP) ............................. 2005-334817

(51) Int. Cl.
*H04N 5/222* (2006.01)
(52) U.S. Cl. .............................. 348/333.11; 348/333.01
(58) Field of Classification Search ............ 348/333.11, 348/333.01
See application file for complete search history.

(56) References Cited

U.S. PATENT DOCUMENTS

| 6,266,724 B1 * | 7/2001 | Harari et al. ................. 710/301 |
| 6,785,403 B1 * | 8/2004 | Murakami et al. ........... 382/104 |
| 2004/0052515 A1 * | 3/2004 | Nishida et al. ............... 396/155 |
| 2005/0083411 A1 * | 4/2005 | Cozier et al. ............. 348/211.1 |

FOREIGN PATENT DOCUMENTS

| JP | 07-284034 | 10/1995 |
| JP | 2003-319211 | 11/2003 |

\* cited by examiner

*Primary Examiner*—Lin Ye
*Assistant Examiner*—Yih-Sien Kao
(74) *Attorney, Agent, or Firm*—Fitzpatrick, Cella, Harper & Scinto

(57) ABSTRACT

In order to display help information at the time when each of a self-timer button, an illumination button, AE lock button and the like is operated, an image pickup apparatus displays help information with understandable wording by the use of simple terms in consideration of the possibility that the user is not proficient in camera operations in the case that the apparatus operates in a full-automatic mode or a photographing mode of an image zone, and displays help information with concise and easily recognizable wording inclusive of technical terms in accordance with necessity in consideration of the possibility that the user is proficient in camera operations to a certain extent in the case that the apparatus operates in a photographing mode of a creative zone.

8 Claims, 9 Drawing Sheets

DISPLAY PANEL ILLUMINATION BUTTON.
ILLUMINATION OF DISPLAY PANEL IS TURNED ON.

FIG. 8

| FIG. 8A |
|---------|
| FIG. 8B |

FIG. 8A

COMBINATION LIST OF PHOTOGRAPHING FUNCTIONS

● : AUTOMATIC SETTING    ○ : SELECTABLE

| MODE DIAL | | | □ | 👤 | 🏔 | 🌷 | ⚽ | 🌙 | 📷 | 🔆 | P | Tv | Av | M | A-DEP |
|---|---|---|---|---|---|---|---|---|---|---|---|---|---|---|---|
| | | | | | IMAGE ZONE | | | | | | | | CREATIVE ZONE | | |
| RECORDING IMAGE QUALITY | | JPEG | ○ | ○ | ○ | ○ | ○ | ○ | ○ | ○ | ○ | ○ | ○ | ○ | ○ |
| | | RAW | | | | | | | | | ○ | ○ | ○ | ○ | ○ |
| ISO SENSITIVITY | | AUTO | ○ | ○ | ○ | ○ | ○ | ○ | ○ | ○ | ○ | ○ | ○ | ○ | ○ |
| | | MANUAL SETTING | | | | | | | | | ○ | ○ | ○ | ○ | ○ |
| WHITE BALANCE | | AUTO WB | ● | ● | ● | ● | ● | ● | ● | ● | ○ | ○ | ○ | ○ | ○ |
| | | PRESET WB, MWS | | | | | | | | | ○ | ○ | ○ | ○ | ○ |
| DEVELOPMENT PARAMETER | | | ● | | | | | | | | ○ | ○ | ○ | ○ | ○ |
| AF | | ONE SHOT | | ● | ● | ● | | ● | ● | | ○ | ○ | ○ | ○ | ● |
| | | AI SERVO | | | | | ● | | | | ○ | ○ | ○ | ○ | — |
| | | AI FOCUS | | | | | | | | ● | ○ | ○ | ○ | ○ | — |

TO FIG. 8B

FIG. 8B (FROM FIG. 8A)

| | | | | | | | | | | | | | | | | | |
|---|---|---|---|---|---|---|---|---|---|---|---|---|---|---|---|---|---|
| AF | AF FRAME SELECTION | AUTO | ● | ● | | ● | ● | ● | ● | | | | | | | | |
| | | OPTION | | | | | | | | | ● | | | | | | | |
| EXPOSURE | PROGRAM SHIFT | | | | | | | | | ○ | ○ | ● | ● | ● | ● | ● | | ○ | ○ | ○ | ○ | ○ | | ○ | ○ | ○ | ● |
| | EXPOSURE CORRECTION | | | ● | ● | ● | ● | ● | ● | | | ● | ● | ● | ● | ● | ○ | ○ | ○ | ○ | ○ | | ○ | ○ | ○ | ● |
| | AEB | | | ● | ● | | ● | ● | ● | ○ | ○ | ● | ● | ● | ● | ● | ○ | ○ | ○ | ○ | ○ | | ○ | ○ | ○ | ● |
| | AE LOCK | ● | ● | ● | | ● | ● | ● | ● | ○ | ○ | ● | ● | ● | ● | ● | ○ | ○ | ○ | ○ | ○ | | ○ | ○ | ○ | ● |
| | DEPTH-OF-FIELD CONFIRMATION | ● | ● | ● | | ● | ● | ● | ● | ○ | ○ | ● | ● | ● | ● | ● | ○ | ○ | ○ | ○ | ○ | | ○ | ○ | ○ | ● |
| PHOTOMETRY METHOD | EVALUATION PHOTOMETRY | ● | | ● | ● | ● | ● | ● | ● | | | | | | | | | | | | | | | | | |
| | PARTIAL PHOTOMETRY | | | | | | ● | ● | ● | | ○ | | | | | | | | | | | | | | | |
| | CENTER PRIORITY AVERAGE PHOTOMETRY | | | | | | ● | ● | ● | | | | | | | | | | | | | | | | | |
| DRIVE | SINGLE PHOTOGRAPHING | ● | | ● | | ● | ● | ● | | | ● | | | | | | | | | | | | | | | |
| | CONTINUOUS PHOTOGRAPHING | | ● | | ● | | | | ● | | | | | | | | | | | | | | | | | |
| BUILT-IN STROBE | AUTO EMISSION | | ○ | ○ | | | | | | | | | | | | | | | | | | | | | | |
| | MANUAL EMISSION | | | | ○ | | | | ○ | | ○ | | | | | | | | | | | | | | | |
| | NO EMISSION | | | ● | | | | | ● | | | | | | | | | | | | | | | | | |
| | RED-EYE RELAXATION | ○ | | ○ | | | | | ○ | | ○ | | | | | | | | | | | | | | | |
| CUSTOM FUNCTION | | | | | | | | | | | ● | ● | ● | ● | ● | ● | ● | ● | ● | ● | ● | | ● | ● | ● | ● |

IMAGE PICKUP APPARATUS AND CONTROLLING METHOD THEREOF

BACKGROUND OF THE INVENTION

1. Field of the Invention

The present invention relates to an image pickup apparatus having a function of providing explanatory information when an operation member is operated or including an operation member for restoring the state of function settings to the initial state of settings, a method of controlling the image pickup apparatus and a computer program.

2. Description of the Related Art

Setting modes, such as the shutter speed mode, the aperture value mode, the exposure meter mode, the AF mode and the AE mode are displayed on an operation panel of a camera having a great number of functions.

Users occasionally desire to get detailed information on a mode for use (photographing operation methods, photographing effects and the like) on the occasion of photographing in any photographing mode and then it used to be required to read a manual to confirm it.

In addition, there occasionally are depicted on a surface or around the periphery of operation buttons of a camera such symbols, characters and drawings and the like that are simplified to express functions of its operation buttons. However, it is not easy to comprehend how to use its functions and their photographing effects, by viewing only such simplified symbols and the like.

Therefore, such a camera is proposed that is arranged to display operation help information on a display panel, consisting of an LCD and the like, provided on the exterior of the camera, to describe operation members, operation methods and the like. As a result, users do not have to bring a manual with them but can know about how to use various kinds of functions and photographing effects obtainable by those functions and the like in details.

For example, Japanese Patent Application Laid-Open No. H07-284034 has disclosed a help information display apparatus capable of presenting optimum menu information corresponding to the proficiency of the users by controlling the presentation of help information on the basis of the operation history of operations for displaying a menu or displaying help information.

In addition, when an image pickup apparatus is in a predetermined state, Japanese Patent Application Laid-Open No. 2003-319211 proposes an image pickup apparatus capable of notifying the user of the occurrence of the predetermined state, and displaying moving image help information or simple help information related to the image pickup apparatus by a display instruction, thereby appropriately presenting information related to the image pickup apparatus in accordance with the proficiency of a user.

Moreover, a camera having a great number of functions is made capable of varying various setting states, as well as setting values of the operation conditions. With a means for keeping on storing those setting values even if when the power supply is turned off, it is possible to use it so as to improve operability while retaining the setting contents of the prior session at the time of the subsequent session. However, on the other hand, as the number of settable item increases, it is bothersome to change respective settings in order to bring the settings in their entirety back to the reference state. And, also there is known such a camera that can bring settings in their entirety back to the reference state under the condition that a user carries out a menu operation.

However, the help information display apparatus described in Japanese Patent Application Laid-Open No. H07-284034 is based only on an operation history on operations for menu display or operations for help display and therefore, optimum menu information corresponding to the proficiency of the users is not necessarily presented. In addition, for proficient users who do not require help display, unless they repeat the number of operations, help information is not set to a "non-display" state, giving rise to such a problem that unnecessary help display is always displayed and bothers these users.

In addition, the image pickup apparatus disclosed in Japanese Patent Application Laid-Open No. 2003-319211 displays the help information only under such a condition that when the image pickup apparatus is in a predetermined state, users who are notified to that effect implement an operation of displaying help information for themselves, giving rise, therefore, to such a problem that a series of operations related to the image pickup apparatus lack smoothness and are bothersome. Moreover, in order that moving image help information or simple help information is caused to be displayed, it is necessary to implement respectively different operations and, therefore, help information different from help information on a desired level might be displayed to introduce confusion.

Moreover, a camera capable of bringing the setting values in their entirety back to the reference state under the condition that a user carries out a predetermined operation, gets users of different proficiency levels back to the same reference state, giving rise, therefore, to a problem that respective users cannot get optimum operability.

The present invention has been attained in view of such actual situations and an object thereof is to provide help information in accordance with the proficiency of a user and make it possible to bring a state of function settings to the initial setting state.

SUMMARY OF THE INVENTION

An aspect of the present invention lies in that an image pickup apparatus having a guidance display unit includes a mode setting unit configured to set a photographing mode of an image pickup apparatus and a guidance display changing unit configured to change a detail level of displayed guidance in accordance with a photographing mode set by the mode setting unit, wherein contents of the displayed guidance of different detail levels of guidance express the same meaning.

Other objects and features of the present invention will become apparent from the following description and the attached drawings.

BRIEF DESCRIPTION OF THE DRAWINGS

FIG. 8 is comprised of FIGS. 8A and 8B showing tables listing combinations of photographing functions for respective photographing modes.

DESCRIPTION OF THE EMBODIMENTS

Preferable embodiments of the present invention will be described below with reference to the accompanying drawings.

First Embodiment

Figure 1:
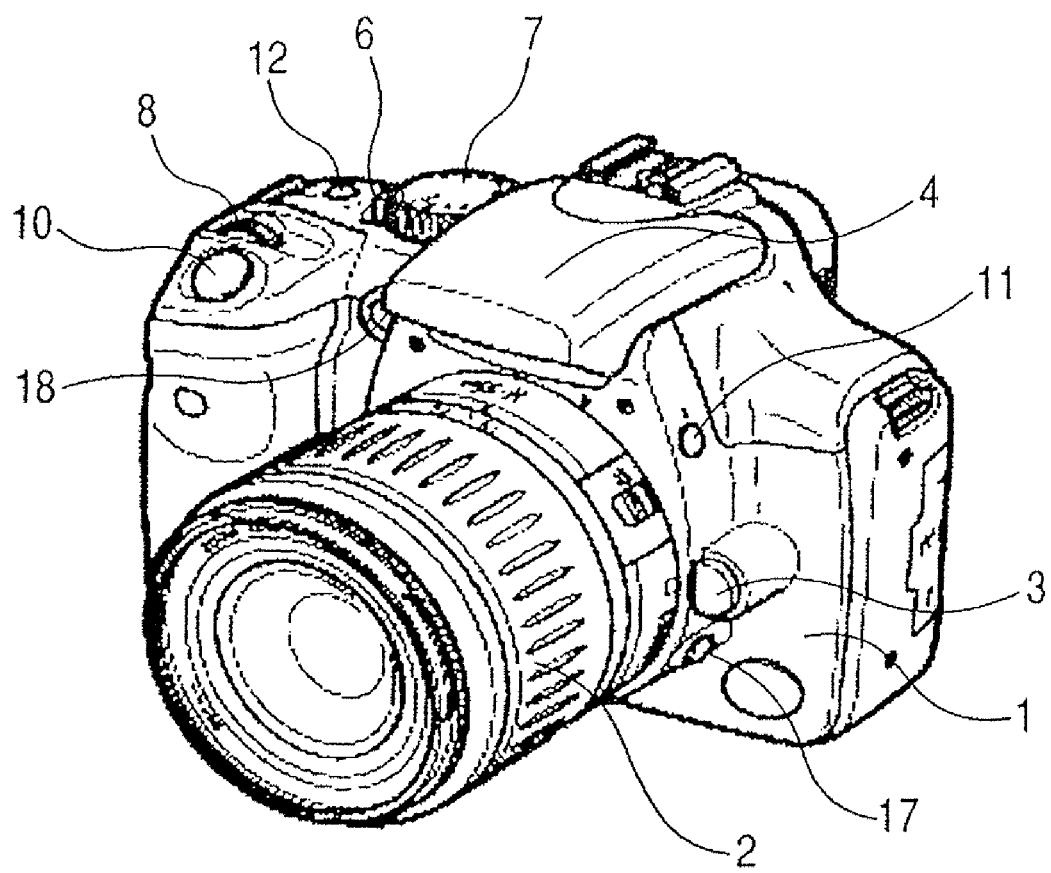
FIG. 1 is a perspective view showing a digital single lens reflex camera of a first embodiment.
Figure 2:
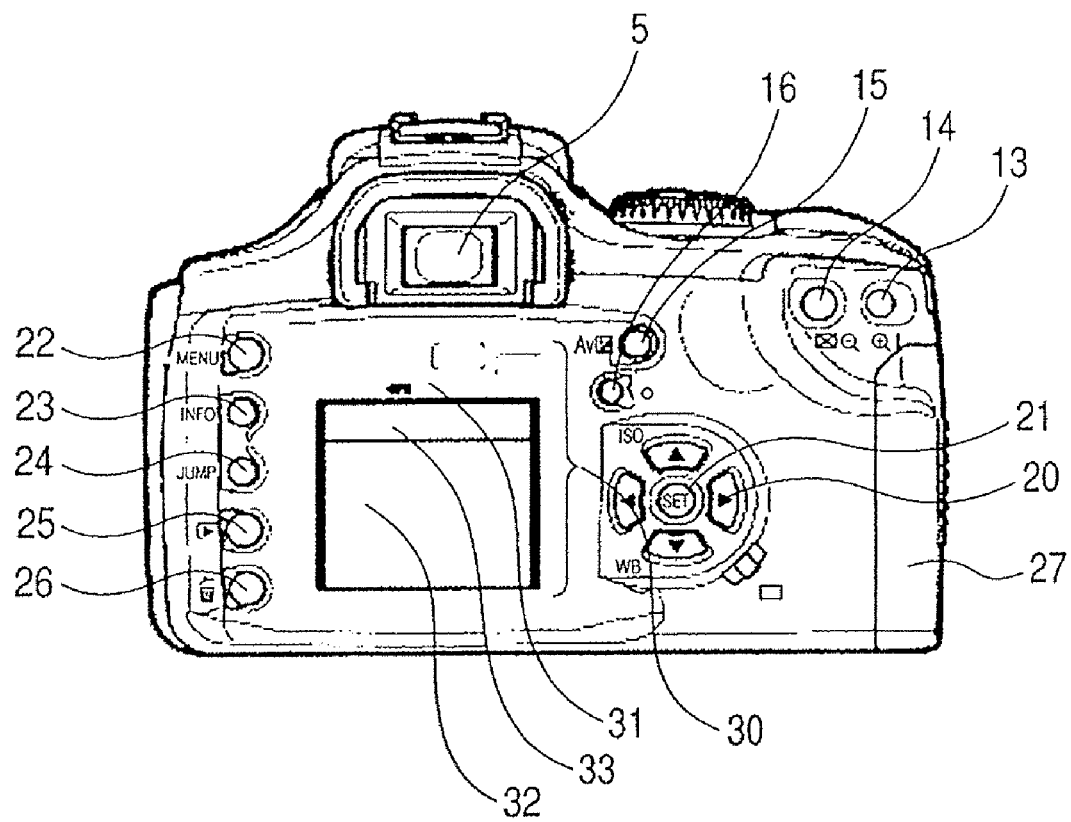
FIG. 2 is a rear view of the digital single lens reflex camera of the first embodiment.

FIG. 1 is a perspective view showing a digital single lens reflex camera of a first embodiment and FIG. 2 is a rear view thereof. Reference numeral 1 denotes a camera main body. Reference numeral 2 denotes an interchangeable lens detachably attachable to the camera main body 1. Reference numeral 3 denotes a lens removal button for removing the interchangeable lens 2 from the camera main body 1. Reference numeral 4 denotes a built-in strobe housed in the camera main body 1. Reference numeral 5 denotes a finder for observing an object.

Reference numeral 6 denotes a main switch for switching ON/OFF of a power supply of the camera. Reference numeral 7 denotes a mode dial for switching respective kinds of photographing modes of the camera. Reference numeral 8 denotes an electronic dial for inputting the respective kinds of photographing conditions such as shutter speed, aperture values.

Reference numeral 10 denotes a release button, which is configured by a two-stage switch for starting photometry and distance measurement and for causing a shutter release to occur. That is, under a state where release button 10 is lightly pressed to a first stage (so-called "half depression"), photometry and distance measurement are carried out. When the half depression further progresses to a second stage (so-called "full depression"), the shutter operates so that a photographing operation is implemented and image information is generated by an image pickup element photometrically converting an image object.

Reference numeral 11 denotes a built-in strobe button for putting the built-in strobe 4 into a usable state. Reference numeral 12 denotes a self-timer button for using a self-timer function built into the camera. Reference numeral 13 denotes an AF frame selection button. After the AF frame selection button 13 is depressed, the electronic dial 8 is rotated; thereby making it possible to change a focusing region in a photographing window, that is, an AF frame.

Reference numeral 14 denotes an AE lock button for initiating the carrying out of AE lock photographing. Reference numeral 15 denotes an exposure correction button for initiating the carrying out of exposure correction in combination with the electronic dial 8. Here, a manual photographing mode can set the aperture values manually with the exposure correction button 15.

Reference numeral 16 denotes an illumination button for initiating the lighting of a back light of the external liquid crystal panel 30. Reference numeral 17 denotes an iris button for initiating the narrowing down of the lens iris to reach an aperture value set at that time. As a result, the user can confirm the depth-of-field. Reference numeral 18 denotes a light emitting red-eye lamp for suppressing a so-called red-eye phenomenon which occurs at the time of strobe photographing.

Reference numeral 20 denotes a four-way operational key for moving selection items vertically and horizontally at the time of implementing various settings on a menu window. Reference numeral 21 denotes a set button for determining selection items.

Reference numeral 22 denotes a menu button for causing external display panel 30 to display a menu. Reference numeral 23 denotes an info button for causing a current setting list of photographing conditions to be displayed.

Reference numeral 24 denotes a jump button for initiating jumping to a preceding or a following image to be replayed, from a replayed image during a replay operation in a replay mode. Reference numeral 25 denotes a replay button for switching to a replay mode for replaying and displaying a recorded image. Reference numeral 26 denotes a delete button for deleting a replayed image.

Reference numeral 27 denotes an external memory card cover, which opens/closes in order to detachably attach an unillustrated external memory card for storing image information generated by photometrically converting light from an object into electrical signals with an image pickup element.

Reference numeral 30 denotes an external liquid crystal panel, which includes by photographing condition display unit 31, a menu display unit 32 and a help display unit 33.

As described above, the digital single lens reflex camera of the first embodiment has a plurality of switches, buttons, and dials of operation members 6 to 8, 10 to 17 and 20 to 26 and the like which are operated in order to set photographing modes and operation conditions and cause the camera to operate.

Figure 3:
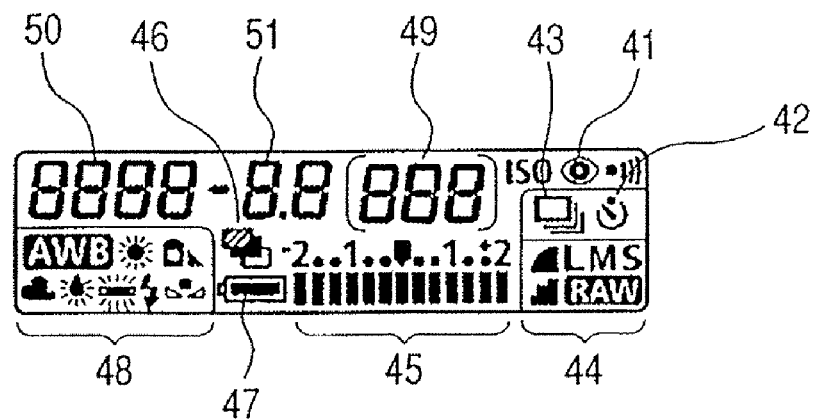
FIG. 3 is a drawing depicting the data displayed by a photographing condition display unit of an external liquid crystal panel.

FIG. 3 shows the display contents of the photographing condition display unit 31 of the external liquid crystal panel 30. The photographing condition display unit 31 displays data representing set photographing conditions, by using a mark expressing them. Specifically, reference numeral 41 denotes a red-eye relaxation mark, which is displayed when a red-eye relaxation function is set. Reference numeral 42 denotes a self-timer mark, which is displayed when a self-timer mode is set.

Reference numeral 43 denotes a drive mode mark, that indicates which of a single photographing mode and a continuous photographing mode is set. Reference numeral 44 denotes a recording image quality display portion, which displays a mark corresponding to the set recording image quality. For example, in case of the depicted example, it is displayed that an RAW format has been set.

Reference numeral 45 denotes an exposure correction display unit, which displays data indicating a difference (the number of stages) from the reference value 0 in the case where exposure correction has been carried out, and the exposure level at the time of manual photographing. Reference numeral 46 denotes an AEB mark, which is displayed when such an AEB function is set that can carry out photographing in three images in series while changing exposure automatically with release operations. Reference numeral 47 denotes a remaining battery level display unit, which displays data indicating the remaining amount of charge in a battery put in the camera.

Reference numeral 48 denotes a white balance display unit, which displays a mark corresponding to a set white balance. Reference numeral 49 denotes a number-of-photographable pictures displaying unit, which displays data indicating the number of photographable pictures, which is estimated from the remaining capacity of a mounted external memory card.

Reference numeral 50 denotes a shutter speed display unit, which displays data indicating the shutter speed manually set by the user or the shutter speed automatically set by the camera. Reference numeral 51 denotes an aperture value display, which displays the set apature value.

Figures 4, 5:
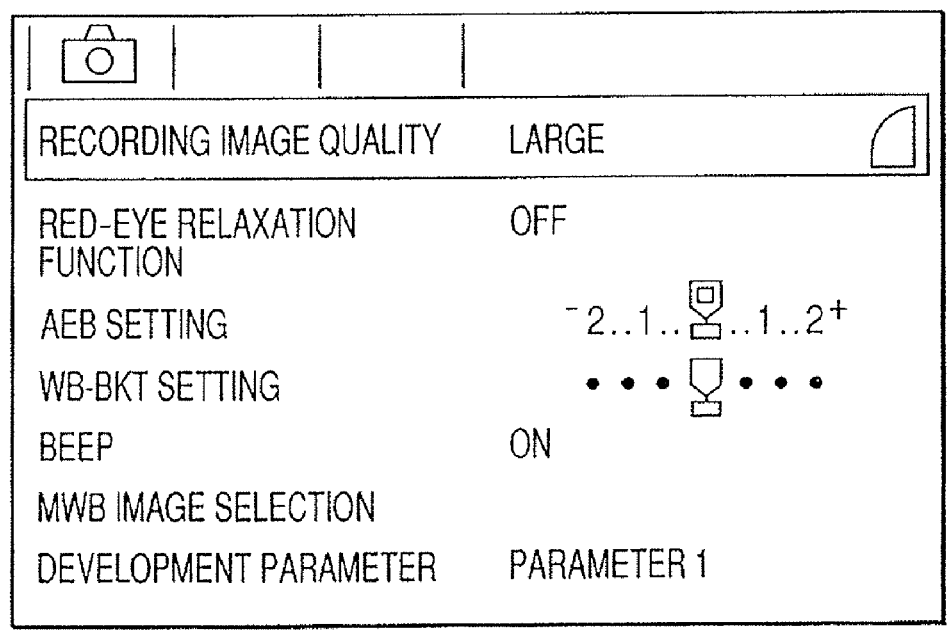
FIG. 4 is a drawing showing an example displayed by a menu display unit of the external liquid crystal panel.
FIG. 5 is a drawing showing an exemplary display of a help display unit of the external liquid crystal panel.

FIG. 4 shows a display example of the menu display unit 32 of the external liquid crystal panel 30. As described above, menu button 22 is depressed so as to display the menu window. Selection of items by using the four-way operational key 20 and the set button 21 in the display region area of the menu display unit 32 enables setting of photographing conditions or replay conditions. In addition, when the replay button 25 is depressed, the menu display unit 32 can display a photographed image as well.

FIG. 5 shows a display example of the help display unit 33 of the external liquid crystal 30. When any of a plurality of operation members described above is operated, the help display unit 33 displays help information of the operation member. The depicted example is a display example when the illumination button 16 is depressed.

Figure 6:
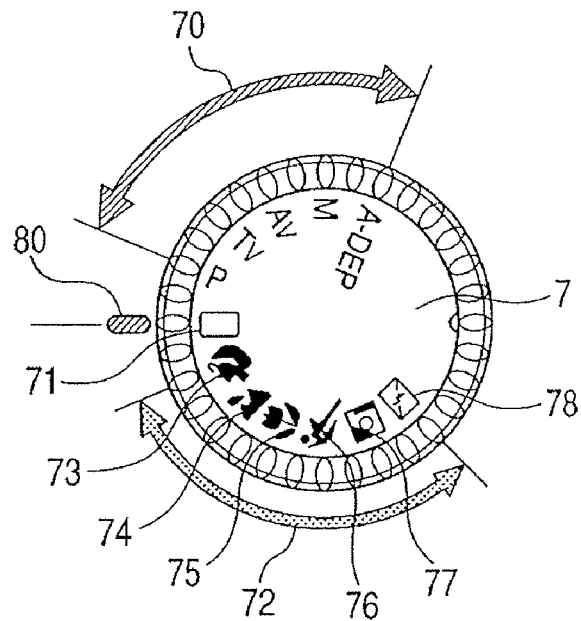
FIG. 6 is a drawing for describing a mode dial.

Next, with reference to FIG. 6, the mode dial 7 will be described. In FIG. 6, reference numeral 70 denotes a creative zone, where the program AE mode "P", the shutter speed priority AE mode "Tv", the aperture priority AE mode "Av", the manual exposure mode "M" and the auto depth mode "A-DEP" are set. When mode dial 7 is rotated so as to match any of these mode marks inscribed in the creative zone 70 with a mode index mark 80 on the side of camera main body 1, a photographing mode corresponding to the mode mark is set.

In intelligent program AE mode "P", when the release button 10 is depressed halfway, the camera automatically determines the shutter speed and an aperture value. The user operates the electronic dial 8 to attain program shifting. In shutter speed priority AE mode "Tv", when a user sets the shutter speed with the electronic dial 8, the camera sets the aperture value automatically in accordance with brightness of an object. In an aperture priority AE mode "Av", when a user sets an aperture value with the electronic dial 8, the camera sets the shutter speed automatically in accordance with brightness of an object. With manual exposure mode "M", a user can carry out photographing by determining the shutter speed or an aperture value. The shutter speed is set directly with the electronic dial 8 and the aperture value is set by rotating the electronic dial 8 while depressing the exposure correction button 15. Auto depth mode "A-DEP" determines an aperture value and a focus position so that a plurality of objects overlapped onto the AF frame falls within the depth-of-field.

In FIG. 6, reference numeral 71 denotes a full-automatic mode and when the mode dial 7 is rotated so as to match the mode mark thereof with the mode index mark 80 on the side of camera main body 1, the full-automatic mode is set.

In FIG. 6, reference numeral 72 denotes an image zone, which sets a portrait mode 73, a landscape mode 74, a close-up mode 75, a sports mode 76, a night view mode 77 and a strobe emission prohibiting mode 78. When the mode dial 7 is rotated so as to match any of the mode marks inscribed in image zone 72 with the mode index mark 80 on the side of cameral main body 1, a photographing mode corresponding to the mode mark is set.

With the full-automatic mode 71 and those photographing modes of the image zone 72, the camera sets an optimum AF frame, shutter speed and an aperture value automatically. Therefore, a user can carry out good photographing simply by only depressing the release button 10.

Help information displayed in the help display unit of the external liquid crystal panel 30 will be described below. Help information is displayed when operation members 7, 11, 12, 13, 14, 15, 16, 17 and the like are operated. Here, help information described in the present embodiment is no more than an example and will not be limited to the contents of statements therein.

The help information taking photographing mode and identification information thereof will now be described.

Figure 7:
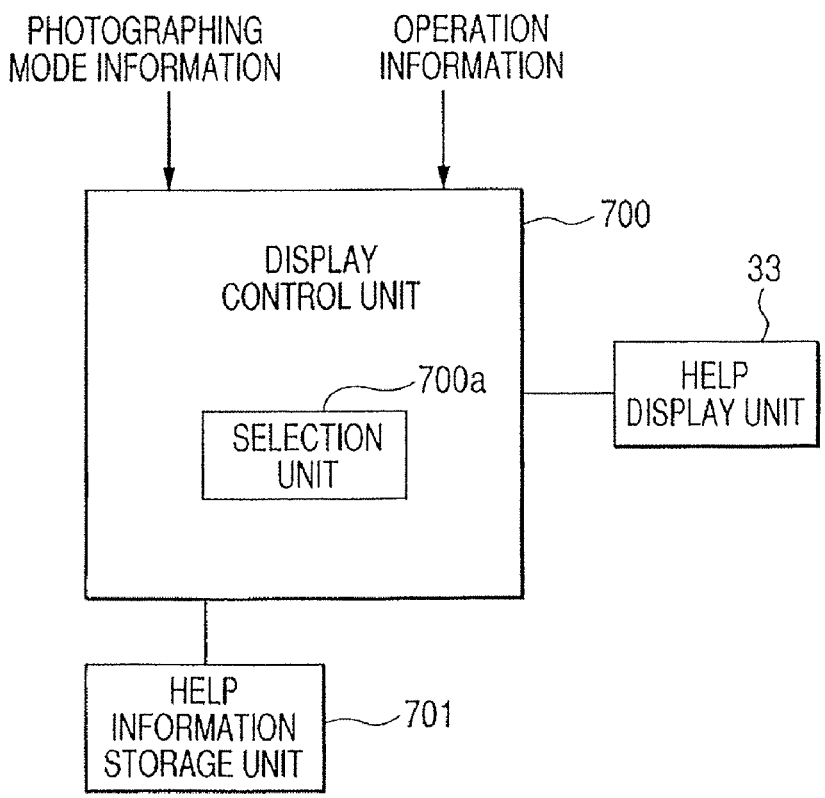
FIG. 7 is a block diagram showing a function configuration of main part of the digital single lens reflex camera of the first embodiment.

FIG. 7 shows a function configuration of key portions of the digital single lens reflex camera of the present embodiment. Here, the same symbols will designate the same or similar configuration elements already described above. Provided inside the camera is a display control unit 700 for carrying out display control of the help display unit 33 in the external liquid crystal panel 30. Photographing mode information set by the mode dial 7, as well as operation information on whether an operation member has been operated or not, is inputted to the display control unit 700. Based on photographing mode information as well as operation information, which will be described below, a selection unit 700a of the display control unit 700 selects and extracts help information (guidance) from a help information storage unit 701 to display it on the help display unit 33.

Help information at the time when the mode dial 7 has been operated will be described at first. When the mode dial 7 is rotated so as to match mode marks inscribed in the mode dial 7 with the mode index mark 80 on the side of camera main body 1, help information of that selected photographing mode is described. When other operation members are operated in that state, a part of or the entire display is switched to help information on the operation members having been operated anew.

Described now is an example of display help information when the mode dial 7 is operated in a full-automatic mode 71 or a photographing mode of the image zone 72. At the time when the full-automatic mode 71 is selected, there is displayed "Now a full-automatic mode is on. Just press down the shutter button and a beautiful picture is photographable."

At the time when a portrait mode 73 of the image zone 72 is selected, there is displayed "Now a portrait mode is on. A picture with unfocused background and vivid front people is photographable." In addition, at the time when a landscape mode 74 is selected, there is displayed "Now a landscape mode is on. Near landscapes to distant landscapes are clearly photographable." In addition, at the time when a close-up mode 75 is selected, there is displayed "Now a close-up mode is on. Near photographing of a small object is also simply photographable." At the time when a sports mode 76 is selected, there is displayed "Now a sports mode is on. This is a mode subject to combination of motion predictive AF and rapid AE optimum for a moving object." At the time when a night view mode 77 is selected, there is displayed "Now a night view mode is on. A night view is photographable in a beautiful state exactly as you see." At the time when a strobe emission prohibiting mode 78 is selected, there is displayed "Now a strobe emission prohibiting mode is on. No emission is allowed even if the strobe is up."

Described next is an example of display help information when the mode dial 7 is operated in a photographing mode of the creative zone 70. At the time when the intelligent program AE mode is selected, there is displayed "Now a (P) intelligent program AE mode is on. Rotate the electronic dial to do program shift." At the time when a shutter-priority AE mode is selected, there is displayed "Now a (Tv) shutter-priority AE mode is on." At the time when an aperture priority AE mode is selected, there is displayed "Now an (Av) aperture priority AE mode is on." At the time when a manual exposure mode is selected, there is displayed "Now an (M) manual exposure mode is on." At the time when an auto depth mode is selected, there is displayed "Now an (A-DEP) auto depth mode is on. The camera sets an aperture value and a focus position so that each of the objects picked up at a plurality of distance measurement points is focused."

Help information will be described below in the state where a photographing mode has been set with the mode dial 7 when the self-timer button 12, the illumination button 16 and the AE lock button 14 are operated, as a representative example.

Self-Timer Button 12

When the self-timer button 12 is depressed with the mode dial 7 already set to the full-automatic mode 71 or a photographing mode of the image zone 72, there is displayed "Now a self-timer mode is on. Please depress the release button fully, taking a look through the finder. Photographing is starting in ten seconds." Moreover, when the self-timer button 12 is depressed once more, there is displayed "Now normal photographing mode is on. Please depress the self-timer button once more in order to get the self-timer mode back."

In contrast, when the self-timer button 12 is depressed with the mode dial 7 having been already set to the photographing mode of the creative zone 70, there is displayed "Now a self-timer mode is on. Please be cautious about finder counter-light. Photographing is starting in ten seconds." Moreover, when the self-timer button 12 is depressed once more, there is displayed "Now a normal photographing mode is on."

Illumination Button 16

When the illumination button 16 is depressed with the mode dial 7 having been already set to the full-automatic mode 71 or a photographing mode of the image zone 72, there is displayed "Now the display panel illumination button is on. Illumination of the display panel is being performed" and illumination of the display panel is performed concurrently.

In contrast, when the illumination button 16 is depressed with the mode dial 7 having been already set to a photographing mode of the creative zone 70, there is displayed "Now display panel illumination button is on. Lighting lasts for six seconds." and illumination of the display panel is performed concurrently.

AE Lock Button 14

When the AE lock button 14 is depressed with the mode dial 7 having been already set to the full-automatic mode 71 or a photographing mode of the image zone 72, there is displayed "Now an AE lock button is on. This is a button for implementing AE lock photographing. * is displayed inside the finder so that an exposure value is fixed."

In contrast, when the AE lock button 16 is depressed with the mode dial 7 having been already set to a photographing mode of creative zone 70, there is displayed "Now AE lock button is on. * is displayed inside the finder and photometry range is set to partial photometry."

The above-described display example of help information is designed to display help information with understandable wording using simple terms in consideration of the possibility that a user is not proficient in camera operation at the time when the mode dial 7 is set to the full-automatic mode 71 or the photographing mode of the image zone 72. In contrast, help information is displayed with concise and easily recognizable wording inclusive of technical terms in accordance with necessity in consideration of the possibility that a user is proficient in camera operation to a certain extent at the time when the mode dial 7 is set to the photographing mode of the creative zone 70. Thus, it becomes possible to provide optimum help information in accordance with the proficiency level of a user so that an image pickup apparatus excellent in operability can be provided.

Here, help information is designed to be displayed and thereafter the subsequent operation is carried out or to disappear after the lapse of a fixed time after display (for example, after the lapse of six seconds).

In addition, in the present embodiment, help information is designed to be displayed on the external liquid crystal panel 30 so that a user is provided therewith but may be provided as audio information.

Below is discussed the use of setting other than the photographing mode as identification information for the help information.

In the example described above, the help information displayed at the time when an operation member is operated has been designed to be selected and provided by using the photographing mode set by the mode dial 7 as identification information, but settings other than the photographing mode may be used as identification information. Described below will be an example that uses, as identification information, the setting of a recording image quality type, the ISO sensitivity, the white balance, a development parameter, the AF mode, the AF frame selection mode, the photometry method, exposure correction setting, and a custom function. Here, a functional configuration in the main parts of a digital single lens reflex camera is likewise the one shown in FIG. 7 and, instead of photographing mode information, there is inputted setting information on ISO sensitivity, the white balance, a development parameter, the AF mode, the AF frame selection mode, the photometry method, an exposure correction setting and a custom function.

ISO sensitivity can be set freely even if the photographing mode of a camera is set in a full-automatic mode 71, photographing modes of the image zone 72 or photographing modes of the creative zone 70. However, it is possible to freely set the recording image quality type, the white balance, a development parameter, the AF mode, the AF frame selection mode, the photometry method, an exposure correction setting and a custom function only when a photographing mode is set to a photographing mode of the creative zone 70, but the camera implements setting automatically when the photographing mode of the camera is set to the full-automation mode 71 or a photographing mode of the image zone 72.

FIGS. 8A and 8B show combination lists of photographing functions for each photographing mode. The recording image quality type, the ISO sensitivity, the white balance, a development parameter, the AF mode, the photometry method and a custom function are respectively selectable inside the menu window not shown in the drawing, by depressing the menu button 2.

As for the recording image quality type, it is possible to set two kinds thereof, that is, a JPEG type of a commonly well known compression type and an RAW type which is a non-compression system and is deemed to require exclusive software for handling. The RAW type takes development treatment with a computer as a precondition and therefore requires technical knowledge but is capable of preparing an image optimum for intended use.

As for ISO sensitivity, it is feasible for either the camera to set the optimum sensitivity automatically (automatic ISO) or for a user to set the sensitivity manually (manual sensitivity setting).

As for the white balance, there is feasible the setting of an optimum white balance automatically in accordance with the photographing state (automatic white balance), setting the white balance to a preset white balance already having been set in advance for respective light sources of a photographing state, or setting the white balance manually.

Development parameters are the contents of settings on development processing of photographed images (contrast, sharpness, depth of color and tone of color), and changing those development parameters can give rise to vivid and clear image or, on the contrary, a dull image through development. In the present embodiment, it is possible to select such a parameter set that can optionally set a reference parameter set in advance, and each of contrast, sharpness, depth of color and tone of color.

An AF mode refers to AF operation properties and is selectable from three kinds of modes, a one shot AF mode suitable for photographing an object staying still, an AI servo AF mode suitable for photographing an object in motion, and an AI focus AF mode implementing switching between the one shot AF mode and the AI servo AF mode automatically.

An AF frame selection mode can select an AF frame by rotating the electronic dial 8 after the AF frame selection button 13 is depressed. For example, seven AF frames are provided and it is possible to select, in accordance with photographing circumstances, an automatic selection mode of implementing automatic selection from the seven AF frames and an optional selection mode selecting any one of the seven AF frames manually.

A photometry method is selectable from three kinds of photometry methods, that is, an evaluation photometry method of providing an object with an appropriate exposure value out of various light circumstances in photographing circumstances, a partial photometry method of metering only a range in the vicinity of an object, and a center-priority average photometry method of averagely metering the entire window by laying emphasis on the center part of the window.

An exposure correction setting is set by rotating the electronic dial 8 while depressing the exposure correction button 15.

A custom function is a functional setting for changing camera functions minutely in accordance with various photographing styles.

Help information at the time of having operated the iris refining button 17 in the state where the ISO sensitivity is set will be described below as a representative example.

Iris Refining Button 17

At the time when the ISO sensitivity is set to an auto ISO, the iris refining button 17 is depressed, and then there is displayed "Now a depth-of-field confirmation button is on. The iris is refined to a set aperture value so that a well-focused range can be confirmed."

In contrast, when iris refining button 17 is depressed with the ISO sensitivity having already undergone a manual sensitivity setting, there is displayed "Now a depth-of-field confirmation button is on."

The above-described display example of help information is designed to display help information with understandable wording using simple terms in consideration of the possibility that a user is not proficient in camera operations at the time when the ISO sensitivity is set to an auto ISO. In contrast, help information is displayed when the ISO sensitivity has undergone a manual sensitivity setting with concise and easily recognizable wording inclusive of technical terms in accordance with necessity in consideration of the possibility that a user is proficient in camera operations to a certain extent. Thus, it becomes possible to provide optimum help information in accordance with the proficiency level of a user so that an image pick up apparatus excellent in operability can be provided.

Described briefly below will be such a case that takes, as identification information, the setting of the recording image quality type, the white balance, the development parameter, the AF mode, the AF frame selection mode, the photometry method, the exposure correction setting and a custom function except for the ISO sensitivity. When the recording image quality type is set to a JPEG type, the possibility that the user is not proficient in camera operations is considered. In contrast, when the recording image quality type is set to the RAW type, there is considered the possibility that the user is proficient in camera operations to a certain extent.

When the white balance is set to the auto white balance, the possibility that the user is not proficient in camera operations is considered. In contrast, when the white balance is set to the preset white balance or is set manually, there considered the possibility that the user is proficient in camera operations to a certain extent.

When the development parameter is set to the reference parameter, the possibility is considered that the user is not proficient in camera operations. In contrast, when the development parameter is set to a parameter set, there considered is the possibility that a user is proficient in camera operations to a certain extent.

When the AF mode is set to the AI focus AF mode, the possibility is considered that the user is not proficient in camera operations. In contrast, when the AF mode is set to the one shot AF mode or the AI servo AF mode, there is considered the possibility that the user is proficient at camera operations to a certain extent.

When the AF frame selection mode is set to the automatic selection mode, the possibility is considered that the user is not proficient in camera operations. In contrast, when the AF frame selection mode is set to the optional selection mode, there is considered the possibility that the user is proficient in camera operations to a certain extent.

When the photometry method is set to the evaluation photometry method, the possibility is considered that the user is not proficient in camera operations. In contrast, when the photometry method is set to the partial photometry method or center-priority average photometry method, there is considered the possibility that a user is proficient in camera operations to a certain extent.

When the exposure correction setting has not been set, the possibility is considered that the user is not proficient in camera operations. In contrast, when the exposure correction setting is set, there is considered the possibility that the user is proficient in camera operations to a certain extent.

When the custom function has not been set, the possibility is considered that the user is not proficient in camera operations. In contrast, when the custom function has been set, there is considered the possibility that a user is proficient in camera operations to a certain extent.

Now to be discussed is the use of help information taking accessory appliances mounted on camera as identification information thereof.

In the example described above, help information at the time when an operation member is operated has been designed to be selected and provided by using the photographing mode, as well as the recording image quality type, the ISO sensitivity, the white balance, the development parameter, the AF mode, the AF frame selection mode, the photometry method, the exposure correction setting and a custom function set by the mode dial 7 as identification information. But accessory appliances mounted on a camera may also be used as identification information. Described below will be an example that uses accessory appliances mounted on a camera as identification information. Here, the functional configuration of the main parts of a digital single lens reflex camera is likewise the one having been shown in FIG. 7, and information on accessory appliances is inputted, instead of the photographing mode information.

As an interchangeable lens of the single lens reflex camera, those having various focal lengths and open aperture values are present in great numbers. The performance and prices thereof differ, and lenses of a common class to lenses of a high class with high performances and high prices are available. In addition, in interchangeable lenses, lenses for special uses, such as a macrolens for near photographing, a tilt lens which can undergo tilt photographing and shift photographing, and the like are available.

In addition, as accessory of a single lens reflex camera, there are present an external strobe, a battery pack, a vertical position grip and the like and those of a common class to a high class are available. The kind of accessory mounted on a camera is identifiable in accordance with the camera reading ID information of the connected accessory.

In addition, as media, there are known two kinds of cards, that is, a card for use in a flash memory which does not extinguish the contents of its memory even if its power is turned off and a card having a compact hard disk built-in. In general, a hard disk built-in memory card has a large capacity and is cheaper than a flash memory card with the same capacity but is structurally fragile and requires cautious handling, and therefore, is frequently used by a user proficient in camera operations to a certain extent. Whether such recording media are mounted on a camera or not can be discriminated by information transmitted to the camera from the recording media when the recording media is mounted on the camera.

When the lens mounted on the camera is a lens of a common class, the possibility is considered that a user is not proficient in camera operations. In contrast, when the lens mounted on the camera is a lens of a high class or for an exclusive use, there is considered the possibility that a user is proficient in camera operations to a certain extent.

When the accessory mounted on the camera is an accessory of a common class, the possibility is considered that the user is not proficient in camera operations. In contrast, when the accessory mounted on the camera is an accessory of a high class, there is considered the possibility that the user is proficient in camera operations to a certain extent.

When the media mounted on the camera is a hard disk built-in memory card, there is considered the possibility that a user is proficient at camera operations to a certain extent.

Here, the present example has been designated to be based on the kinds of accessory appliances, but may be designated to be based on the setting of the accessory appliances.

An embodiment designated as help information 1 will now be discussed, which uses a combination of camera settings and accessory appliances as identification information thereof.

Identification information may be designated using a combination of a photographing mode described above, the other settings (the recording image quality type, the ISO sensitivity, the white balance, the development parameter, the AF mode, the AF frame selection mode, the photometry method, the exposure correction setting and the setting of a custom function) and accessory appliances mounted on a camera. Described below will be an example that uses this combination thereof as identification information.

The use of the built-in strobe button 11 in this embodiment will now be described.

When the built-in strobe button 11 is depressed with the mode dial 7 having been already set to the full-automatic mode 71 or the photographing mode of the image zone 72 (at that time, the recording image quality type is set to a JPEG type automatically), there is displayed "Now built-in strobe up button is on. The strobe is lighted at the time of photographing. When it is not used, please depress the strobe with hands" and the built-in strobe 4 is lifted up concurrently.

In contrast, when the built-in strobe button 11 is depressed with the mode dial 7 having been already set to the photographing mode of the creative zone 70 and with the recording image quality type having already been set to the JPEG type, there is displayed "Now built-in strobe up button is on. Tuned shutter speed is 1/200." and the built-in strobe button 4 is lifted up concurrently.

In addition, when the mode dial 7 is set to the photographing mode of the creative zone 70 and the recording image quality type is set to the RAW type, even if the built-in strobe button 11 is depressed, help information will not be displayed but the built-in strobe button 4 is lifted up.

Figure 9:
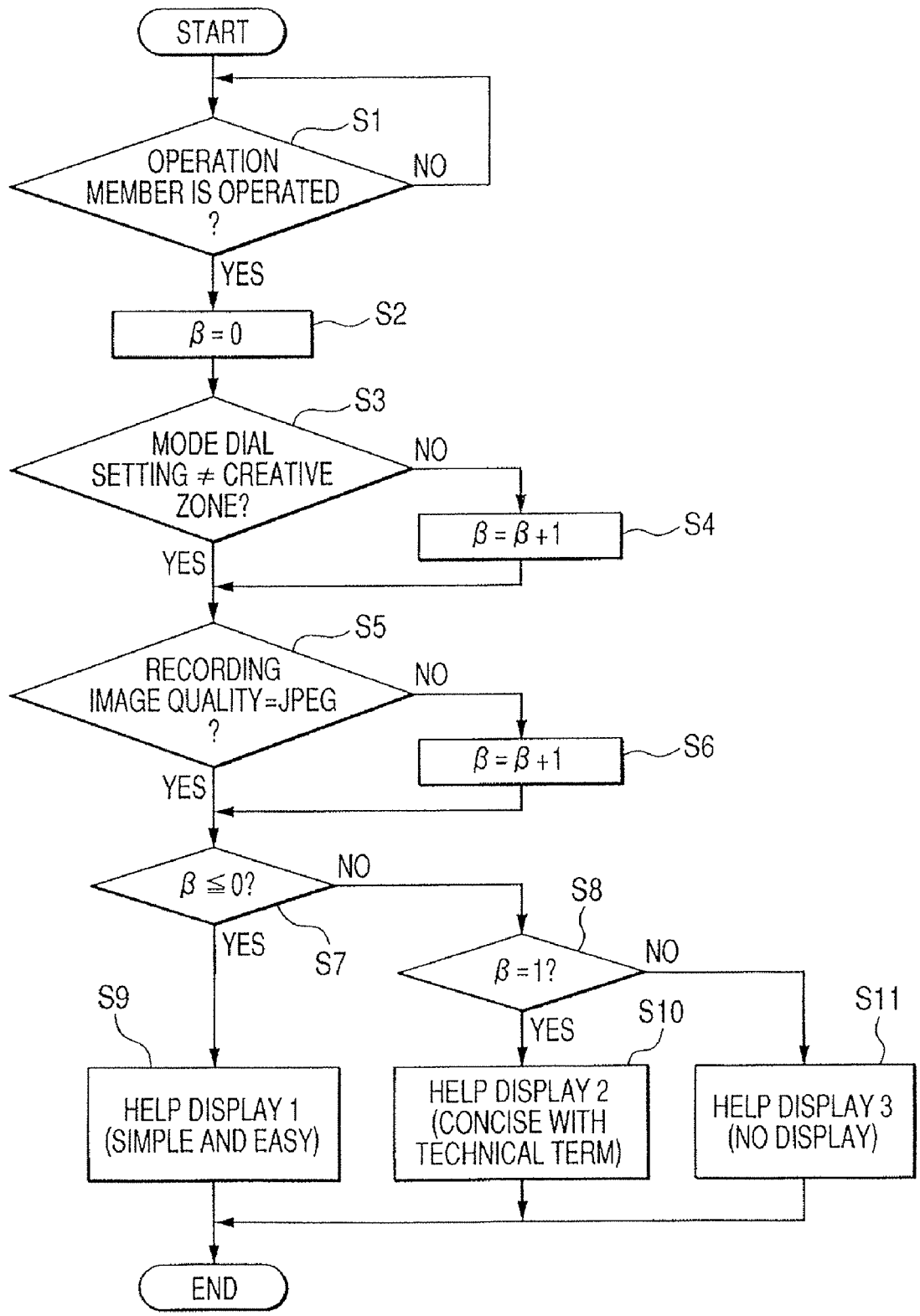
FIG. 9 is a flow chart for describing a display control example of help information in the first embodiment.

FIG. 9 shows a flow chart of help information display control at the time when the built-in strobe button 11 is depressed. When the built-in strobe button 11 is depressed (Step S1), help information discriminating information β is initialized (Step S2). Next, it is determined whether or not the mode dial 7 is set to the photographing mode of the creative zone 70 (Step S3).

In the case where the mode dial 7 is not set to a photographing mode of the creative zone 70 in Step S3, that is, in case of being set to the full-automatic mode 71 or the photographing mode of the image zone 72, the step method moves to Step S5. In contrast, in the case where the mode dial 7 is set to a photographing mode of the creative zone 70, "1" is added to help information discriminating information β (Step S4) and thereafter, the method moves to Step S5. In that case, since help information discriminating information β is initialized in Step S2, β=β+1 will be derived.

In Step S5, it is determined whether or not the recording image quality type is set to the JPEG type. In the case where the recording image quality type is set to the JPEG type, the method moves directly to Step S7. In contrast, in the case where the recording image quality type is not set to the JPEG type, that is, is set to the RAW type, "1" is added to help information discriminating information β (Step S6) and thereafter, the step method to Step S7.

In Step S7, it is determined whether or not help information discriminating information β is equal to or less than 0. In the case where help information discriminating information β is equal to or less than 0, the method goes forward to Step S9 to display help information display 1 (simple and easy expression). In contrast, in the case where help information discriminating information β is larger than 0, the method goes forward to Step S8 to determine whether or not help information discriminating information β is 1. In the case where help information discriminating information β is 1, the method goes forward to Step S10 to display help information display 2 (concise with technical term). In contrast, in the case where help information discriminating information β is not 1, that is, is larger than 1, the method goes forward to Step S11 to designate help information display 3 (no display).

The use of the exposure correction button 15 in this embodiment will now be described.

When the exposure correction button 15 is depressed with the mode dial 7 already set to the full-automatic mode 71 or the photographing mode of the image zone 72 (at that time, the recording image quality type is automatically set to the JPEG type), there is displayed "With this photographing mode, this exposure correction button does not operate. Please switch the photographing mode to the creative mode when you want to set exposure correction."

In contrast, when the exposure correction button 15 is depressed with the mode dial 7 having been already set to the photographing mode of the creative zone 70 and the recording image quality type having been set to the JPEG type, there is displayed "Now an exposure correction button is on. With ⅓ stage step, setting is feasible within a range of ±2 stages." In that case, it is possible for a user to set exposure correction by rotating the electronic dial 8.

In addition, even if the exposure correction button 15 is depressed when the mode dial 7 is already set to the photographing mode of the creative zone 70 and the recording image quality type is already set to the RAW type, help information is not displayed. In that case, although the help information is not displayed, it is possible for a user to set exposure correction by rotating the electronic dial 8.

Here, an algorithm of help information display control when the exposure correction button 15 is depressed is likewise the flow described in the flow chart in FIG. 9, and therefore a description thereof will be omitted.

The above-described examples of the built-in strobe button 11 and the exposure correction button 15 are designed to display help information with simple terms and easy wording in consideration of the possibility that a user is not proficient in camera operations at the time when the mode dial 7 is set to the full-automatic mode 71 or the photographing mode of the image zone 72 (automatically set to the JPEG type). In contrast, help information is displayed with concise and easily recognizable wording inclusive of technical terms in accordance with necessity in consideration of the possibility that the user is proficient in camera operations to a certain extent at the time when the mode dial 7 is set to a photographing mode of the creative zone 70 and the recording image quality type is set to the JPEG type. In addition, when the mode dial 7 is already set to a photographing mode of the creative zone 70 and the recording image quality type is already set to the RAW type, help information is determined unnecessary and is not displayed in consideration of the possibility that the user is rather proficient in camera operations.

Below is described what is termed help information 2, which uses a combination of camera settings and accessory appliances as identification information thereof.

The use of the AF frame selection button 13 in help information 2 will now be described.

When the AF frame selection button 13 is depressed with the mode dial 7 having been already set to the full-automatic mode 71 or a photographing mode of the image zone (at that time, the photometry method is set to the evaluation photometry), there is displayed "With this photographing mode, this AF frame selection button does not operate. Please switch the photographing mode to the creative mode when the AF frame was selected optionally."

In contrast, when the AF frame selection button 13 is depressed with the mode dial 7 having been already set to a photographing mode of the creative zone 70 and with photometry method having been already set to the evaluation photometry, there is displayed "Now the AF frame selection button is on. It is possible to select out of seven AF frames optionally." In this case, it is possible for a user to select an AF frame by rotating the electronic dial 8.

In addition, when the mode dial 7 is set to a photographing mode of the creative zone 70 and the photometry method is set to the partial photometry or to center-priority average photometry, even if the AF frame selection button 13 is depressed, help information will not be displayed. In that case, although the help information is not displayed, it is possible for a user to select an AF frame by rotating the electronic dial 8.

Figure 10:
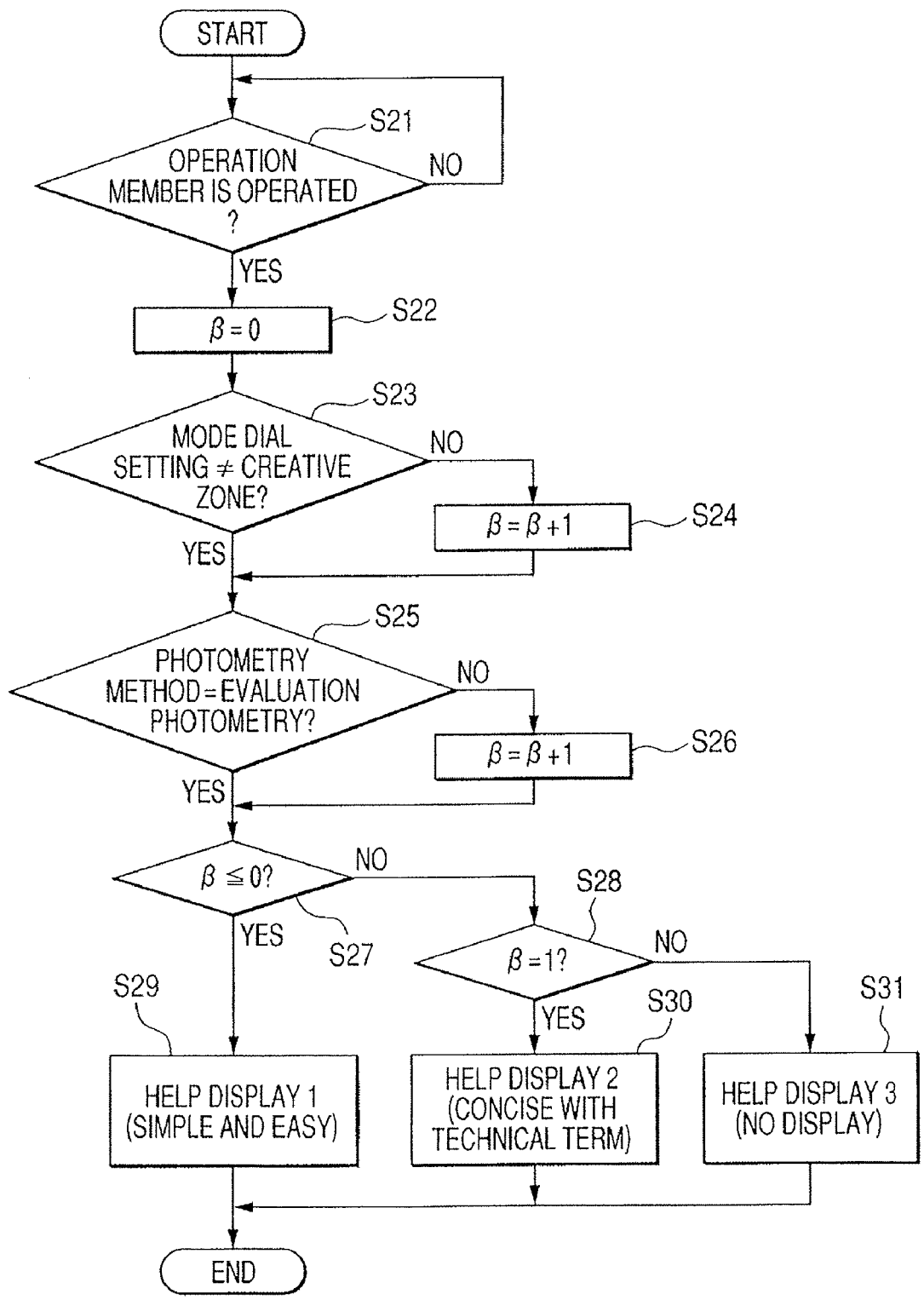
FIG. 10 is a flow chart for describing a display control example of help information in the first embodiment.

FIG. 10 shows a flow chart of help information display control at the time when the AF frame selection button 13 has been depressed. When the AF frame selection button 13 is depressed (Step S21), help information discriminating information β is initialized (Step S22). Next, it is determined whether or not the mode dial 7 is set to a photographing mode of creative zone 70 (Step S23).

In the case where the mode dial 7 is not set to a photographing mode of the creative zone 70, in Step S23, that is, in the case of being set to the full-automatic mode 71 or a photographing mode of the image zone 72, the step directly moves to Step S25. In contrast, in the case where the mode dial 7 is set to a photographing mode of creative zone 70, "1" is added to help information discriminating information β (Step S24) and thereafter, the step moves to Step S25. In that case, since help information discriminating information β is initialized in Step S22, β=β+1 will be derived.

In Step S25, it is determined whether or not the photometry method is set to the evaluation photometry method. In the case where the photometry method is set to the evaluation photometry method, the step moves directly to Step S27. In contrast, in the case where the photometry method is not set to the evaluation photometry method, that is, is set to the partial photometry method or the center-priority average photometry method, "1" is added to help information discriminating information β (Step S26) and thereafter, the step moves to Step S27.

In Step S27, it is determined whether or not help information discriminating information β is equal to or less than 0. In the case where help information discriminating information β is equal to or less than 0, the step goes forward to Step S29 to display help display 1 (simple and easy expression). In contrast, in the case where help information discriminating information β is larger than 0, the step goes forward to Step S28 to determine whether or not help information discriminating information β is 1. In the case where help information discriminating information β is 1, the step goes forward to Step S30 to display help information display 2 (concise with technical term). In contrast, in the case where help information discriminating information β is not 1, that is, is larger than 1, the step goes forward to Step S31 to designate help information display 3 (no display).

The above-described example of the AF frame selection button 13 is designed to display help information with simple terms and easy wording in consideration of a possibility that the user is not proficient in camera operations at the time when the mode dial 7 is set to the full-automatic mode 71 or a photographing mode of the image zone 72 (automatically set to the evaluation photometry method). In contrast, help information is displayed with concise and easily recognizable wording inclusive of technical terms in accordance to necessity in consideration of the possibility that the user is proficient in camera operations to a certain extent at the time when the mode dial 7 is set to a photographing mode of the creative zone and the photometry method is set to the evaluation photometry method. In addition, when the mode dial 7 is already set to a photographing mode of the creative zone 70 and the photometry method is already set to the partial photometry method or the center-priority average photometry method, help information is determined unnecessary and is not displayed in consideration of the possibility that the user is rather proficient in camera operations.

Here, in order to select help information, identification information is not limited to a combination of a photographing mode and the recording image quality or the photometry method but may be based on other combinations. In addition, the combination is not limited to two patterns but combinations of more patterns may be adopted.

Second Embodiment

Figure 11:
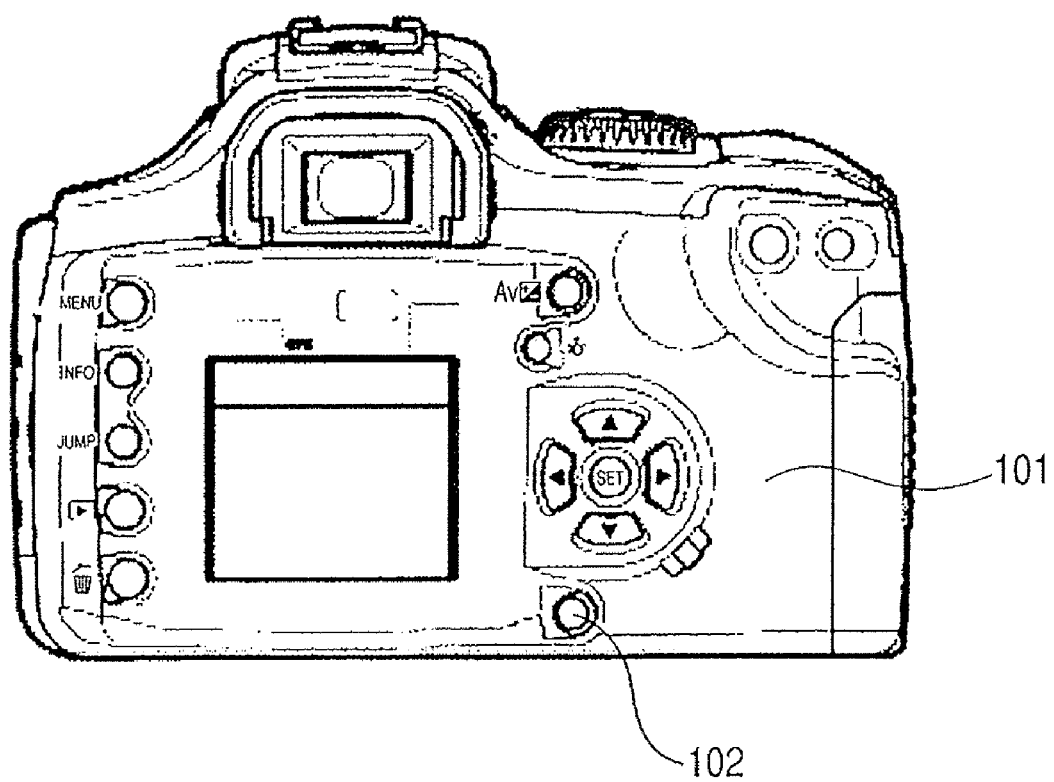
FIG. 11 is a rear view showing a digital single lens reflex camera of a second embodiment.

FIG. 11 is a rear view showing a digital single lens reflex camera of a second embodiment. A digital single lens reflex camera 101 of the present embodiment has a great number of functions as having been described in the first embodiment. Here, in FIG. 11, the numbering of components having been described in FIGS. 1 and 2 is omitted.

Thus, due to a great number of functions, setting various functions during photographing may result in a setting state entirely different from the initial setting state. In that case, when an operation greatly different from the present setting is desired, the required setting had better be implemented from the initial setting state so that convenient and swift operation is may be attained.

Therefore, the digital single lens reflex camera 101 of the present embodiment is provided with a setting initialization button 102 on the rear side thereof. It is configured to be feasible to cancel the present setting in its entirety to put it back to the initial setting state by depressing the setting initialization button 102.

In an explanation with a specific example, the camera 101 is set to the full-automatic mode 71 or a photographing mode of the image zone 72 with mode dial 7 and function setting is assumed to be as follows: "Recording image quality type: JPEG" (automatically set by the camera)

"ISO sensitivity: 400"

"White balance: auto white balance" (automatically set by the camera)

"Development parameter: reference parameter" (automatically set by the camera)

"AF mode: AI focus AF" (automatically set by the camera)

"AF frame selection mode: automatic selection"(automatically set by the camera)

"Photometry method: evaluation photometry": (automatically set by the camera)

"Exposure correction setting: no setting": (automatically set by the camera)

"Self-timer mode: yes"

"Custom function: no setting" (automatically set by the camera).

In that case, depressing the setting initialization button 102, the first initial setting state is reinstated, including:

"Recording image quality type: JPEG" (automatically set by the camera)

"ISO sensitivity: auto ISO" (changed)

"White balance: auto white balance" (being left to automatically be set by the camera)

"Development parameter: reference parameter" (being left to automatically be set by the camera)

"AF mode: AI focus AF" (being left to automatically be set by the camera)

"AF frame selection mode: automatic selection" (being left to automatically be set by the camera)

"Photometry method: evaluation photometry" (being left to automatically be set by the camera)

"Exposure correction setting: no setting" (being left to automatically be set by the camera)

"Self-timer mode: no" (changed)

"Custom function: no setting" (being left to automatically be set by the camera).

In contrast, the mode dial 7 is designated to set a photographing mode of creative zone 70, functional setting is assumed as follows:

"Recording image quality type: RAW"

"ISO sensitivity: 400"

"White balance: auto white balance"

"Development parameter: manual set"

"AF mode: one shot AF"

"AF frame selection mode: optional selection"

"Photometry method: partial photometry":

"Exposure correction setting: +1.0 stage"

"Self-timer mode: yes"

"Custom function: setting present".

In that case, depressing the setting initialization button 102, the second initial setting state is reinstated, including:

"Recording image quality type: JPEG" (changed)

"ISO sensitivity: 400" (no change)

"White balance: auto white balance" (no change)

"Development parameter: reference parameter" (changed)

"AF mode: one shot AF" (no change)

"AF frame selection mode: optional selection" (no change)

"Photometry method: evaluation photometry" (changed)

"Exposure correction setting: +0.0 stage" (changed)

"Self-timer mode: no" (changed)

"Custom function: no setting" (changed).

The above-described initialization example of the setting state is to return respective kinds of setting to such first initialization setting that make it possible for a camera to carry out adequate photographing automatically, in consideration of the possibility that the user is not proficient in camera operations at the time when the mode dial 7 is set to the full-automatic mode 71 or a photographing mode of the image zone 72. In contrast, such second initialization setting is reinstated that does not rely on a camera for various kinds of setting but reflect the intention of the user to a certain extent, in consideration of the possibility that the user is skilled in camera operations to a certain extent at the time when the mode dial 7 is set to a photographing mode of the creative zone 70.

Also in the present embodiment, besides the photographing mode set by the mode dial 7 being taken as identification information, the setting of a recording image quality type, the ISO sensitivity, the white balance, a development parameter, the AF mode, the AF frame selection mode, the photometry method, the exposure correction setting and a custom function may be occasionally taken as identification information, accessory appliances mounted in the camera may be taken as identification information or they may be combined.

Here, it goes without saying that an object of the present invention is attained also by supplying a system or an apparatus with storage media having stored program codes of software realizing functions of the above described embodiment and by a computer (or a CPU and an MPU) of the system or the apparatus reading and executing program codes stored in the storage media.

In that case, the program codes themselves read out from the storage media will realize functions of the above described embodiment and the program codes themselves as well as the storage media having stored the program codes thereof will configure the present invention.

Those selected from the group consisting of a flexible disk, a hard disk, an optical disk, a magneto-optical disk, a CD-ROM, a CD-R, a magnetic tape, a nonvolatile memory card, a ROM and the like, for example, can be used as storage media for supplying program codes.

In addition, it goes without saying that not only functions of the above described embodiment are realized by a computer, which reads and carries out the program codes, but also such a case is also included that an OS (basic system or operating system) and the like in operation on the computer carries out a part or all of the actual processing based on instructions of the program codes thereof and functions of the above described embodiment are realized with the processing thereof.

Moreover, it goes without saying that there also included is a case where program codes read out from the storage media are written into a memory installed in a functional extension board inserted into a computer and a functional extension unit connected to a computer; thereafter a CPU and the like installed in the functional extension board and the functional extension unit carries out a part or all of the actual processing based on instructions of the program codes thereof; and functions of the above described embodiment are realized by the processing thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-334817, filed Nov. 18, 2005, which is hereby incorporated by reference herein in its entirety.

What is claimed is:

1. An image pickup apparatus having a guidance display unit, comprising:
   a) an identification unit configured to identify external appliances connected to said image pickup apparatus;
   b) a determining unit configured to determine whether each of the external appliances is of a second class of appliances different from a first class of appliances as well as whether each of the external appliances is of the first class, on the basis of an identification result of the identification unit; and
   c) a display control unit configured to control display of guidance information in accordance with a result of the determination by the determining unit so as to display first guidance information stored in advance in a storing unit as guidance information to be displayed for a user proficient in operating the image pickup apparatus when an operation member of the image pickup apparatus is operated in a specific operating manner, if the determining unit determines that the external appliance is of the first class, and to display second guidance information different from the first guidance information, stored in advance in the storing unit as guidance information to be displayed for the user not proficient in operating the image pickup apparatus when the operation member of the image pickup apparatus is operated in the same specific operating manner, if the determining unit determines that the external appliance is of the second class, wherein the first and second guidance information, each of which is displayed when the operation member of the image pickup apparatus is operated in the same specific operating manner, are provided in such a manner that the number of words included in the first guidance information is less than that in the second guidance information.

2. A controlling method of an image pickup apparatus having a guidance display unit, comprising:
   a) an identification step of identifying external appliances connected to said image pickup apparatus; and
   b) a determining step of determining whether each of the external appliances is of a second class of appliances different from a first class of appliances as well as whether each of the external appliances is of the first class, on the basis of an identification result in the identification step; and
   c) a display control step of controlling display of guidance information in accordance with a result of the determination in said determining step so as to display first guidance information stored in advance in a storing unit as guidance information to be displayed for a user proficient in operating the image pickup apparatus when an operation member of the image pickup apparatus is operated in a specific operating manner, if the determining step determines that the external appliance is of the first class, and to display second guidance information different from the first guidance information, stored in advance in the storing unit as guidance information to be displayed for the user not proficient in operating the image pickup apparatus when the operation member of the image pickup apparatus is operated in the same specific operating manner, if the determining step determines that the external appliance is of the second class, wherein the first and second guidance information, each of which is displayed when the operation member of the image pickup apparatus is operated in the same specific operating manner, are provided in such a manner that the number of words included in the first guidance information is less than that in the second guidance information.

3. A non-transitory computer-readable medium encoded with a program causing a computer to execute control of an image pickup apparatus having a guidance display unit that implements guidance display in accordance with operations of a predetermined operation member, comprising:
   a) identification processing code for identifying external appliances connected to said image pickup apparatus;
   b) determining code for determining whether each of the external appliances is of a second class of appliances different from a first class of appliances as well as whether each of the external appliances is of the first class, on the basis of an identification result by the identification processing code; and
   c) display controlling code for controlling display of guidance information in accordance with a result of the determination by said determining code so as to display first guidance information stored in advance in a storing unit as guidance information to be displayed for a user proficient in operating the image pickup apparatus when an operation member of the image pickup apparatus is operated in a specific operating manner, if the determining code determines that the external appliance is of the first class, and to display second guidance information different from the first guidance information, stored in advance in the storing unit as guidance information to be displayed for the user in operating the image pickup apparatus when the operation member of the image pickup apparatus is operated in the same specific manner, if the determining code determines that the external appliance is of the second class, wherein the first and second guidance information, each of which is displayed when the operation member of the image pickup apparatus is operated in the same specific operating manner, are provided in such a manner that the number of words included in the first guidance information is less than that in the second guidance information.

4. The image pickup apparatus according to claim 1, wherein the identification unit identifies an interchangeable lens mounted on the image pickup apparatus as one of the external appliances, and wherein the determination unit determines that the external appliance is of the first class if the identification unit identifies that the interchangeable lens is at least one of a macro lens for close-up photographing and a tilt lens for tilt photographing and shift photographing.

5. The image pickup apparatus according to claim 1, wherein the identification unit identifies a type of at least one of an external strobe, a battery pack and vertical position grip, mounted on the image pickup apparatus as the external appliances.

6. An image pickup apparatus having a guidance display unit, comprising:

a) an identification unit configured to identify a type of a memory card connected to said image pickup apparatus;

b) a determining unit configured to determine whether the memory card is a memory card having therein a hard disk as well as whether the memory card is a memory card of a flash memory type, on the basis of an identification result of the identification unit; and c) a display control unit configured to control display of guidance information in accordance with the determination by the determining unit so as to display first guidance information stored in advance in a storing unit as guidance information to be displayed for a user proficient in operating the image pickup apparatus when an operation member of the image pickup apparatus is operated in a specific operating manner, if the determining unit determines that the memory card is the memory card having therein the hard disk, and to display second guidance information different from the first guidance information, stored in advance in the storing unit as guidance information to be displayed for the user not proficient in operating the image pickup apparatus when the operation member of the image pickup apparatus is operated in the same specific operating manner, if the determining unit determines that the memory is the memory card of the flash memory type, wherein the first and second guidance information, each of which is displayed when the operation member of the image pickup apparatus is operated in the same specific operating manner, are provided in such a manner that the number of words included in the first guidance information is less than that in the second guidance information.

7. A control method of an image pickup apparatus having a guidance display unit, comprising:

a) an identification step of identifying a type of a memory card connected to said image pickup apparatus;

b) a determining step of determining whether the memory card is a memory card having therein a hard disk as well as whether the memory card is a memory card of a flash memory type, on the basis of an identification result in the identification step; and c) a display control step of controlling display of guidance information in accordance with a determination by the determining step so as to display first guidance information stored in advance in a storing unit as guidance information to be displayed for a user proficient in operating the image pickup apparatus when an operation member of the image pickup apparatus is operated in a specific operating manner, if said determining step determines that the memory card is the memory card having therein the hard disk, and to display second guidance information different from the first guidance information, stored in advance in the storing unit as guidance information to be displayed for the user not proficient in operating the image pickup apparatus when the operation member of the image pickup apparatus is operated in the same specific operating manner, if said determining step determines that the memory is the memory card of the flash memory type, wherein the first and second guidance information, each of which is displayed when the operation member of the image pickup apparatus is operated in the same specific operating manner, are provided in such a manner that the number of words included in the first guidance information is less than that in the second guidance information.

8. A non-transitory computer-readable medium encoded with a program causing a computer to execute control of an image pickup apparatus having a guidance display unit that implements guidance display in accordance with operations of a predetermined operation member, the program comprising:

a) identification code for identifying a type of a memory card connected to the image pickup apparatus;

b) determining code for determining whether the type of the memory card is a memory card having therein a hard disk as well as whether the memory card is a memory card of a flash memory type, on the basis of an identification result by the identification step; and c) display control code for controlling display of guidance information in accordance with a determination by said determining code so as to display first guidance information stored in advance in a storing unit as guidance information to be displayed for a user proficient in operating the image pickup apparatus when an operation member of the image pickup apparatus is operated in a specific operating manner, if said determining code determines that the memory card is the memory card having therein the hard disk, and to display second guidance information different from the first guidance information, stored in advance in the storing unit as guidance information to be displayed for the user not proficient in operating the image pickup apparatus when the operation member of the image pickup apparatus is operated in the same specific operating manner, if said determining code determines that the memory is the memory card of the flash memory type, wherein the first and second guidance information, each of which is displayed when the operation member of the image pickup apparatus is operated in the same specific operating manner, are provided in such a manner that the number of words included in the first guidance information is less than that in the second guidance information.

* * * * *